Oct. 15, 1974 G. L. HUGHES Re. 28,201

END CLOSURE FOR DISPOSABLE DUST BAG

Original Filed Aug. 27, 1965 4 Sheets-Sheet 1

INVENTOR
George Leslie Hughes
BY
Ell Pennender
his ATTORNEY

END CLOSURE FOR DISPOSABLE DUST BAG

Original Filed Aug. 27, 1965 4 Sheets-Sheet 3

INVENTOR
George Leslie Hughes
BY
W. J. Fernandes
ATTORNEY

END CLOSURE FOR DISPOSABLE DUST BAG
Original Filed Aug. 27, 1965 4 Sheets-Sheet 3
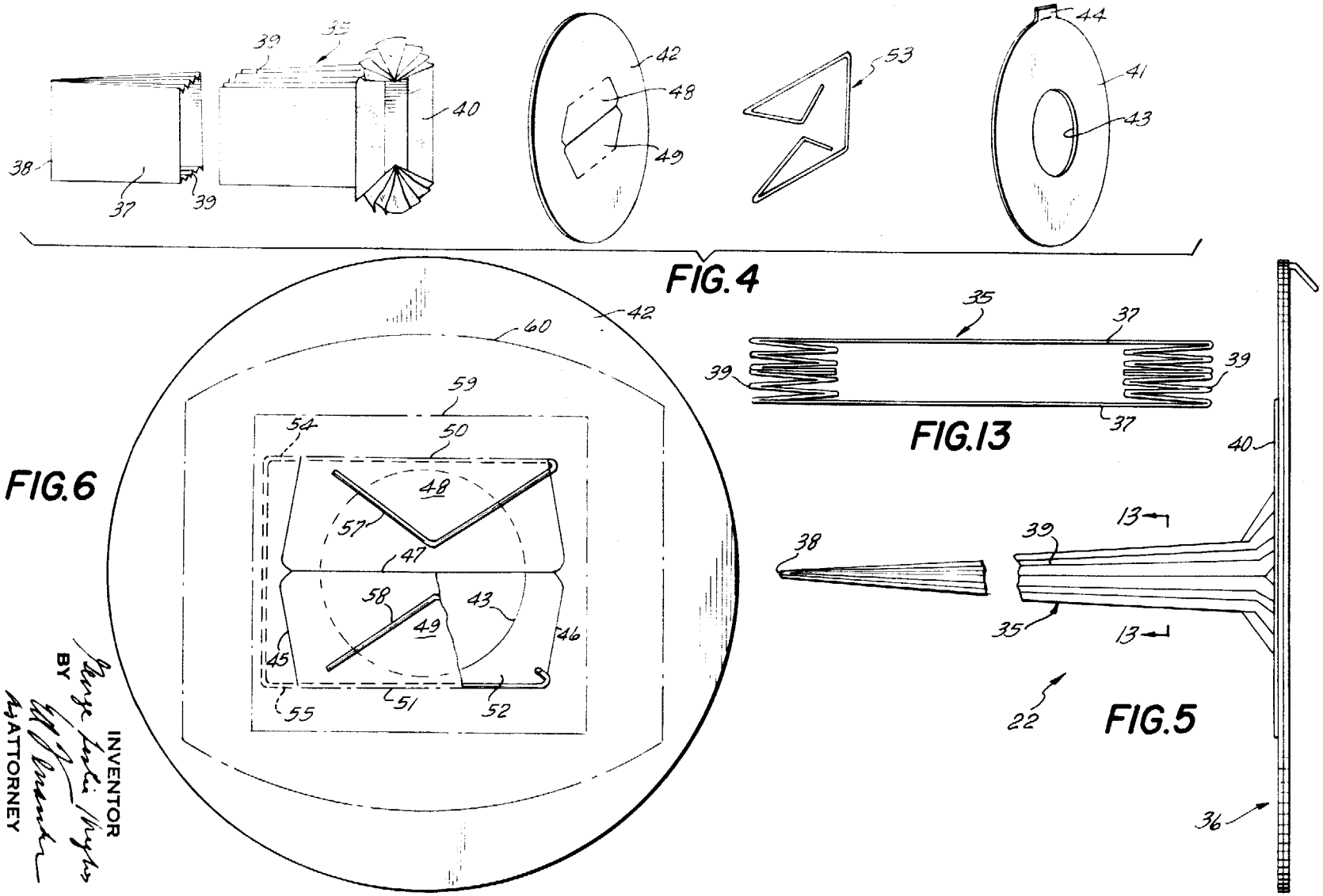
INVENTOR
George Leslie Hughes
BY
E. L. Wenander
ATTORNEY END CLOSURE FOR DISPOSABLE DUST BAG
Original Filed Aug. 27, 1965
4 Sheets-Sheet 4
FIG.10
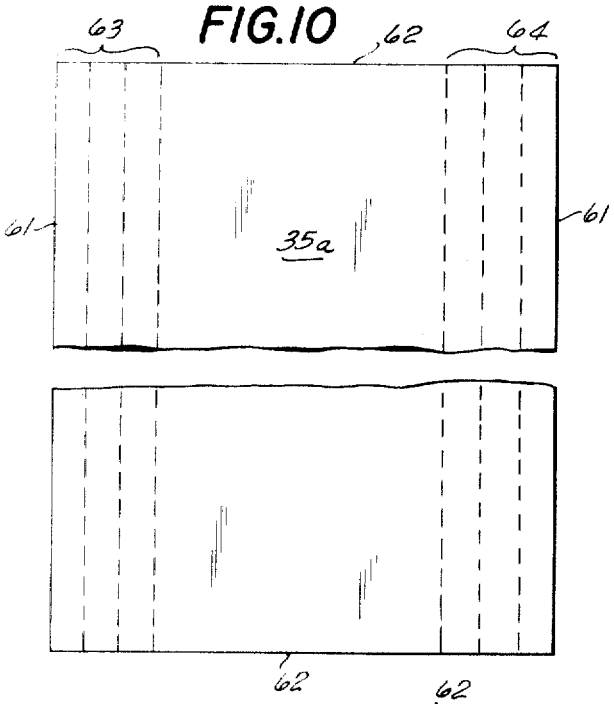
FIG.8
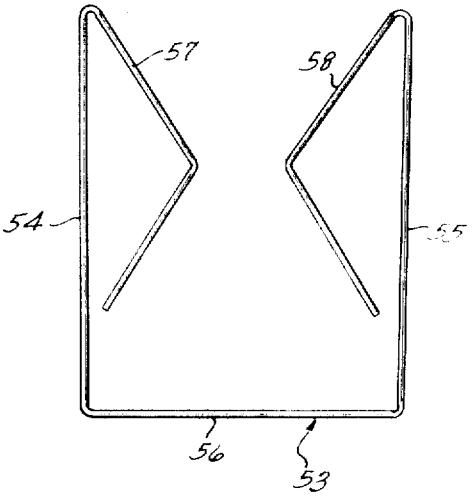
FIG.11
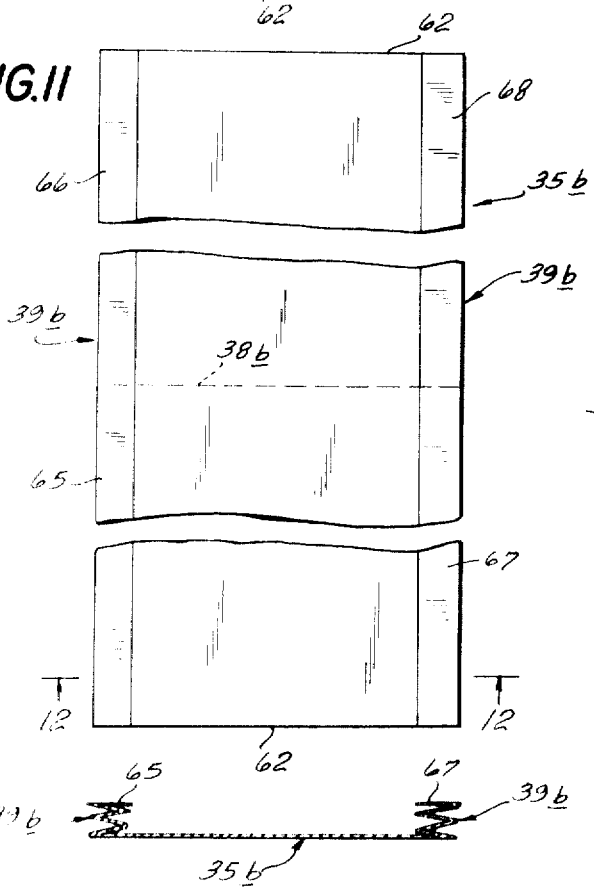
FIG.12
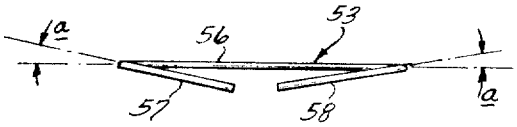
FIG.9
INVENTOR
George Leslie Hughes
BY
Ell Fenander
his ATTORNEY United States Patent Office Re. 28,201
Reissued Oct. 15, 1974

28,201

END CLOSURE FOR DISPOSABLE DUST BAG

George Leslie Hughes, Biddenham, England, assignor to Aktiebolaget Electrolux, Stockholm, Sweden Original No. 3,423,907, dated Jan. 28, 1969, Ser. No. 483,183, Aug. 27, 1965. Application for reissue Oct. 13, 1969, Ser. No. 869,974
Claims priority, application Sweden, Sept. 8, 1964, 10,791/64
Int. Cl. B01d *29/10*
U.S. Cl. 55—367 8 Claims

Matter enclosed in heavy brackets [ ] appears in the original patent but forms no part of this reissue specification; matter printed in italics indicates the additions made by reissue.

ABSTRACT OF THE DISCLOSURE

An end closure for a dust bag formed by super-imposed outer and inner flexible sheets, the outer sheet having a single hole coplanar therewith and through which dust-laden air is introduced into the dust bag, the inner sheet having a plurality of cuts therethrough and a plurality of scorings therein defining two flaps which are integral therewith and coplanar with the inner sheet and partially severed therefrom, both flaps when coplanar with the inner sheet extending in opposite directions toward one another with their outer free edges in abutting relation and with both flaps covering the single hole in the outer sheet and also overlying regions of the inner face of the outer sheet about the hole, and the unsevered scorings in the inner sheet being located at opposite sides of the hole in the outer sheet and serving as hinges about which the flaps swing into the dust bag, both flaps swinging into the dust bag when force is applied thereto to form a single aperture in the inner sheet which is coplanar therewith and at least as large as the single hole in the outer sheet and in registry therewith.

*Each of the flaps is urged to its closed position by a length of spring steel which is associated therewith and maintained in position by anchoring and sandwiching each length of spring steel between the super-imposed outer and inner flexible sheets which are adhesively secured together.*

This invention relates to a dust bag for a vacuum cleaner, the dust bag being of the kind which is disposable or thrown away when full, and which is self-sealing or normally closed, but can be automatically opened either by insertion of the tubular end of the usual flexible hose of the vacuum cleaner, or by insertion of a tubular member forming part of an end cover of the vacuum cleaner.

It is an object of this invention to provide an end closure for such disposable and self-sealing dust bags which is efficient in operation and yet is relatively inexpensive to produce.

Disposable and self-sealing dust bags are known, for example, of the type in which a paper dust bag is attached at its open end to a mounting plate provided with a circular hole normally closed by an elastic diaphragm having a small central hole. When the tubular end of the hose or other tubular member is pushed through the hole in the mounting plate, the diaphragm is stretched and its small hole greatly enlarged, so that the tubular hose end or member can enter and communicate with the interior of the dust bag. When the tubular hose end or member is withdrawn, the diaphragm resumes its normal shape and substantially closes the dust bag. This known construction is disadvantageous in that it is somewhat expensive and does not satisfy the requirement for a really low cost disposable or "throw away" bag.

According to this invention, a disposable and self-sealing dust bag for a vacuum cleaner comprises an end closure or a mounting plate with a hole for entry of dust and the like, means for automatically closing the hole, and a bag fixed to one face of the mounting plate around the hole therein.

According to a feature of the invention, the end closure or mounting plate of a disposable and self-sealing dust bag comprises two layers of cardboard or the like each having a central hole, with the central hole of the inner layer being closed by spring-biased flap means and the central hole of the outer layer being of smaller area than that of the inner layer to provide a surrounding abutment zone against which the flap means can bear and thus be prevented from opening outwardly.

*The flap means is formed by a pair of flaps, each of which is spring-biased to its closed position by a length of spring steel associated therewith. The lengths of spring steel are maintained in position by anchoring and sandwiching them between the two layers of cardboard which are adhesively secured together.*

According to another important feature of the invention, closing of the central hole of the inner cardboard layer is effected by two flaps which are defined by integrally connected parts formed or cut from the inner layer so as to be swingable inwardly about parallel, spaced fold lines, and such flaps are urged to their closed positions against the abutment zone surrounding the central hole of the outer layer by means of a one-piece spring. The one-piece spring for urging the flaps to their closed positions is preferably of generally U-shaped configuration to present legs which extend along the fold lines of the flaps and are connected by a cross-piece anchored between the two adhesively secured together layers, and the spring further has arms extending from the free ends of its legs to lie against the surfaces of the flaps facing away from the outer layer, whereby the legs of the spring torsionally resist inward swinging of the flaps from their closed positions.

The above, and other objects, features and advantages of the invention, will be apparent in the following detailed description of an illustrative embodiment of the invention which is to be read in connection with the accompanying drawings, wherein:

FIG. 4 is an exploded perspective view of the several components of a disposable and self-sealing dust bag embodying this invention;

FIG. 5 is an enlarged side elevational view of the dust bag assembled from the components of FIG. 4;

FIG. 6 is a plan view of the mounting plate of the dust bag, as viewed from the inner side thereof, and with one of the flaps being partly broken away;

FIG. 8 is a plan view of the spring forming a part of the mounting plate;

FIG. 9 is an end view of the spring;

FIG. 10 is a plan view of a paper blank from which a disposable dust bag is produced;

FIG. 11 is a view of the blank after the pleating thereof;

FIG. 12 is a sectional view taken along the line 12—12 on FIG. 11; and

FIG. 13 is a sectional view taken along the line 13—13 on FIG. 5.

Figure 1:
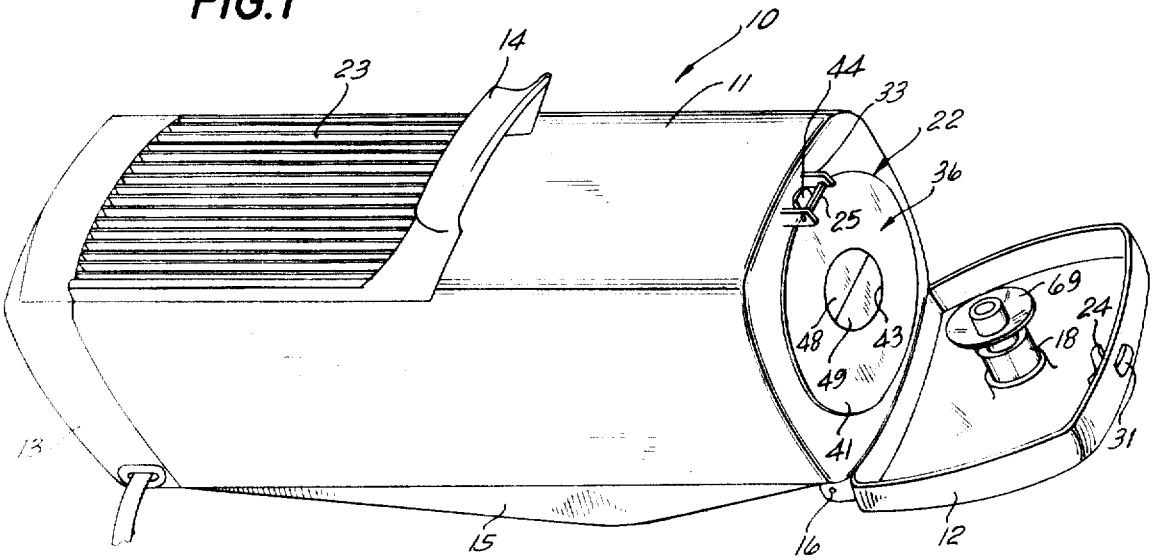
FIG. 1 is a perspective view of a vacuum cleaner having a dust bag embodying this invention disposed therein, and with the end cover of the vacuum cleaner being shown in its open position.

Referring to the drawings in detail, and initially to FIG. 1 thereof, it will be seen that a vacuum or suction cleaner 10 for which the disposable and self-sealing dust bags embodying this invention are intended may be of the tank type comprising a casing 11 having a front end cover 12 and a rear end cover 13. The casing 11 is provided with a handle 14 and with skids 15, as shown, or wheels on which it can be moved.

The front end cover 12 may be removably secured on the front end of the casing 11 in any suitable manner. In the illustrated cleaner, the cover 12 is hinged to the casing 11 by means of a hinge pin 16 to adapt the front end cover to swing away from and open the adjacent end of the casing. The end cover 12 is formed with an air inlet opening 17 (FIG. 3) surrounded by a rearwardly projecting tube 18 (FIGS. 1, 2 and 3) adapted to removably receive one end of a suction hose (not shown). The outer free end of the suction hose is connected to a wand on which suitable cleaning appliances may be detachably mounted.

At the front end of casing 11 there is an annular flange 19 (FIG. 3) which carries a resilient sealing ring or gasket 20. A cloth filter bag 21 extends from gasket 20 into casing 11 and is adapted to receive a disposable and self-sealing dust bag 22 embodying this invention which acts to separate dust and other suspended material from air entering the casing through the tube 18. The flow of air through the casing 11 is effected by a motor-fan unit (not shown) mounted within the rear end portion of the casing to receive air which passes through the dust bag 22 and the cloth filter bag 21 and to discharge the air through an air outlet opening 23 (FIG. 1).

The end cover 12 is normally held in its closed position (FIG. 3) by a latch mechanism that includes a latch member 24 on the cover and a latch keeper 25 mounted on the casing 11. As shown, the latch member 24 may comprise a sheet metal plate pivotally mounted at one end on a pin 26 and having a latching detent or catch 27 adjacent its other end. Pin 26 is mounted between bosses 28 on cover 12, and a hairpin spring 29 surrounds pin 26 and has its legs engaged with a lug 30 on the cover and with latch member 24 to urge the latter toward its latching position. An integral lug extends upwardly from latch member 24 and carries a push button 31 which projects into an opening 32 in cover 12. The latch keeper 25 may be in the form of a pin extending between spaced lugs 33 projecting forwardly from flange 19 of casing 12 and being receivable in latching detent 27, as shown on FIG. 3. When push button 31 is manually depressed, latch member 24 is rocked downwardly and releases keeper 25 from detent 27 to permit swinging of cover 12 to its open position, as shown on FIGS. 1 and 2. When cover 12 is moved to its closed position, a curved nose 34 on latch member 24 cams under keeper pin 25 until the latter is received in detent 27 to hold the cover in its closed position.

Figure 2:
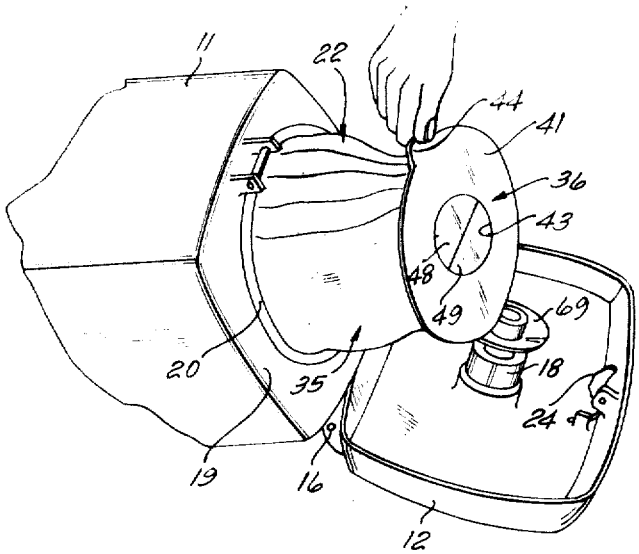
FIG. 2 is a fragmentary perspective view similar to a portion of FIG. 1, but illustrating the withdrawal of the dust bag, when full, from the vacuum cleaner.
Figure 3:
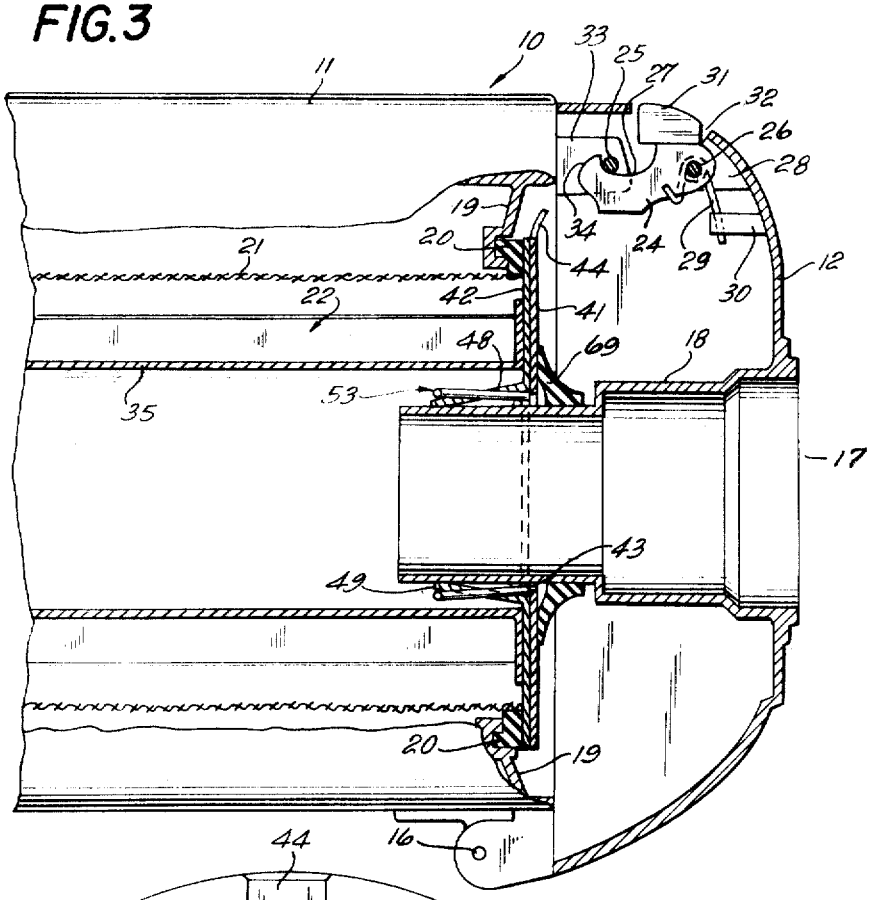
FIG. 3 is an enlarged, fragmentary axial sectional view of the vacuum cleaner with the dust bag installed therein.

Referring now to FIGS. 2 and 5, it will be seen that the dust bag 22 generally comprises a paper bag 35 and a mounting plate assembly 36. The bag 35 is formed of a single sheet of filter paper, as hereinafter described, so as to have walls 37 (FIGS. 4 and 13) joined at one end of the bag, as at a fold 38 (FIGS. 4 and 5), and also joined at the sides of the bag by longitudinal pleats 39. The number of the pleats 39 is not critical, and is selected in accordance with the permissible air resistance of the total bag surface, taking into account the air permeability of the paper and its properties in resisting clogging by fine particles of dust. The walls 37 and the pleats 39 at the open end of the bag 35 remote from the fold 38 are splayed outwardly so as to present a generally flattened end zone 40 (FIGS. 4 and 5) around the mouth of the bag at which the latter is adhesively attached to the inner surface of mounting plate assembly 36.

Figure 7:
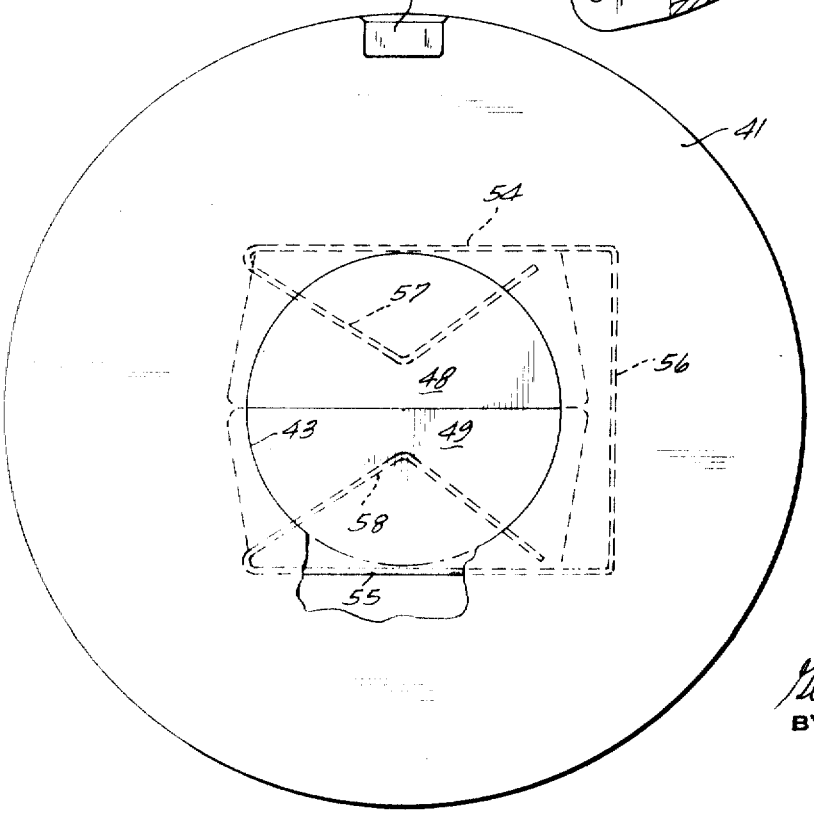
FIG. 7 is a view similar to that of FIG. 6, but showing the mounting plate as viewed from the outer side thereof, and with part of the outer layer being broken away.

In accordance with this invention, the end closure or mounting plate assembly 36 includes outer and inner flexible sheets 41 and 42 which are both in the form of discs and may be formed of cardboard, for example. The outer disc or layer 41 has a central round hole 43 (FIGS. 4 and 7) dimensioned to receive the tube 18 of cover 12 and a tab 44 projecting from its periphery by which the mounting plate assembly may be grasped when effecting manual removal of the dust bag from the vacuum cleaner, as shown on FIG. 2.

The inner cardboard layer or disc 42 has its central region cut along spaced lines 45 and 46 and along a line 47 connecting the mid-points of lines 45 and 46 (FIG. 6) to define two flaps 48 and 49 which are bendable or swingable about score or fold lines 50 and 51 extending between the ends of lines 45 and 46. As shown on FIG. 6, the hole 43 of disc 41 has a smaller area than the opening defined in disc 42 when flaps 48 and 49 are opened or swung inwardly about score lines 50 and 51 so that, when discs 41 and 42 are adhesively secured together, an abutment zone 52 is defined around hole 43 within the area of the flaps 48 and 49 to prevent outward opening of the flaps.

The mounting plate assembly 36 further includes a one-piece, generally U-shaped spring 53 of piano wire or the like which is bent into the configuration shown on FIGS. 8 and 9 so as to have legs 54 and 55 connected, at one end, by a cross-piece 56, and preferably V-shaped arms 57 and 58 extending from the free ends of legs 54 and 55 into the space between the latter. As shown particularly on FIG. 9, the V-shaped arms 57 and 58 preferably normally lie in planes that are offset by the angles a, of approximately 10°, with respect to the plane containing legs 54 and 55 and cross-piece 56, so as to facilitate arrangement of the spring 53 with its legs 54 and 55 extending along the score lines 50 and 51 at the outer or front surface of disc 42 and with its V-shaped arms 57 and 58 in back of flaps 48 and 49, respectively, as shown on FIG. 6. After spring 53 has been arranged with respect to disc 42, as described above, discs 41 and 42 are adhesively secured to each other in facially abutting relation, whereby cross-piece 56 of the spring is anchored between the two adhesively secured discs or cardboard layers and thereby maintained in the desired assembled position. When in such assembled position with arms 57 and 58 lying in back of, or against, the inner surfaces of flaps 48 and 49, it will be apparent that legs 54 and 55 of the spring torsionally resist inward swinging of arms 57 and 58 by the flaps and thereby urge the flaps to their closed positions against the abutment zones 52 of disc 41 for closing the opening or hole 43.

The outwardly splayed or flattened zone 40 of paper bag 35 is adhesively attached to the back or inner surface of inner disc 42 at the region of the latter defined between the dot-dash lines 59 and 60 shown on FIG. 6. In order to facilitate such attachment of the paper bag 35 to the mounting plate assembly 36, the inner layer or disc 42 may be cut more or less along the line 59 so as to form a central section containing the flaps 48 and 49 and a peripheral section constituted by the portion of disc 42 disposed outside of line 59.

In the case where the disc 42 is formed of a central section and a peripheral section, as described above, only the central section is initially attached to disc 41 for securing springs 53 in its assembled position, and the splayed or flattened zone 40 of paper bag 35 is adhesively attached to the peripheral section of disc 42 prior to the attachment of that peripheral section to disc 41 so as to extend around the previously attached central section.

The method for producing the paper bag 35 will now be described with reference to FIGS. 10–13.

Starting with a rectangular blank 35a (FIG. 10) of porous paper having relatively long sides 61 and relatively short sides 62, such blank is initially folded, at opposite longitudinal edge zones 63 and 64, successively along lines 65, 66 and 67. This results in the structure 35b of FIG. 11 in which sets of pleats 39b extend along the opposite relatively long sides of the pleated blank. The pleated blank 35b is then folded along a line 38b which is parallel to, and midway between, the short sides 62. By folding along line 38b, the faces 65 and 66, and the faces 67 and 68 of the sets of pleats 39b are brought into abutting relationship, in which face 65 is adhesively secured to face 66, and face 67 to face 68. As will be realized, this produces a bag generally similar to that shown in FIG. 4, except for the deformed or outwardly splayed open end. Thus the fold line 38b of FIG. 11 corresponds to the fold 38 of FIG. 4. The bag so produced is clamped in a vise or other clamping tool, with only the top or open end portion projecting therefrom, and such projecting portion is then splayed out and flattened, so that it forms the deformed and generally flattened end zone or portion 40 of FIGS. 4 and 5 for adhesive attachment to the mounting plate assembly 36, as described above.

When a dust bag 22 embodying this invention is to be installed in vacuum cleaner 10, end cover 12 is opened, as shown on FIG. 1, and paper bag 35 is inserted into cloth filter bag 21 until mounting plate assembly 36 seats against gasket 20. Thereafter, when cover 12 is moved to its closed position, as shown on FIG. 3, tube 18 is projected through hole 43 of disc 41 and acts against flaps 48 and 49 to fully open the same against the resistance of spring 53. Further, an annular gasket 69 on tube 18 abuts against mounting plate assembly 36 around openinf 43 to hold the plate assembly against gasket 20 and to complete the seal for ensuring that all air entering through tube 18 must pass through paper bag 35.

During use of the vacuum cleaner 10, the paper bag 35 gradually becomes filled with dust and the like and expands accordingly. Although the pleats 39 permit such expansion, the folding of the pleats at the closed end of the bag, at 38, and the attachment of the splayed end portion 40 to the rigid mounting plate assembly 36 limit the expansion of the pleats 39 and thus ensure that, when the paper bag 35 is filled, it will nevertheless be easily removable from within the cloth filter bag 21.

When bag 35 is filled, cover 12 is opened, as shown on FIG. 2, to withdraw its tube 18 from the hole 43 of mounting plate assembly 36 and spring 53 then strongly urges flaps 48 and 49 to their closed positions for sealing the dust bag 22. The tab 44 may then be grasped to effect removal of the dust bag 22 as a unit, whereupon a new bag can be installed.

It will be apparent that the provision of two flaps 48 and 49 on the mounting plate assembly 36 ensures that such flaps will project a relatively short distance into the bag 35 when in their fully open position so that the accumulation of dust and the like in the bag, even when filled, does not interfere with the efficient closing of the flaps by the spring 53. Further, the use of a single spring 53 to close both flaps 48 and 49 simplifies and reduces the cost of the disposable and self-sealing dust bag 22. The described arrangement of springs 53 and its secure attachment in plate assembly 36 ensures that such spring will efficient perform its function of closing flaps 48 and 49 without the danger of tearing the paper bag 35 or damaging the flaps. Finally, the described arrangement of the mounting plate assembly 36 results in a dust bag 22 of such low cost as to be truly disposable after use.

In view of the foregoing, it will now be understood that the superimposed flexible sheets 41 and 42 define an end closure 36 for the dust bag 35 in which the outer sheet 41 is formed with a single hole 43 which is coplanar therewith and through which dust-laden air is adapted to be introduced into the dust bag 35. The inner sheet 42 has a plurality of cuts 45, 46 and 47 therethrough and a plurality of scorings 50 and 51 therein defining the two flaps 48 and 49 which are integral with the sheet 42 and partially severed therefrom. The flaps 48 and 49 are normally cantilevered from the inner sheet 42 and, when coplanar therewith, so arranged that they extend in opposite directions toward one another with their outer free edges in abutting relation and with both flaps 48 and 49 covering the single hole 43 in the outer sheet 41 and also overlying the regions 52 of the inner face of the outer sheet 41 about the hole 43.

The unsevered scorings 50 and 51 in the inner sheet 42 are located at opposite sides of the hole 43 in the outer sheet 41 and serve as hinges about which the flaps 48 and 49 swing into the dust bag 35. As explained above, the flaps are adapted to be forcibly swung into the dust bag 35 to form a single aperture in the inner sheet 42 which is coplanar therewith and at least as large as the single hole 43 in the outer sheet and in registry therewith.

The flaps 48 and 49 are biased to their positions coplanar with the inner sheet 42 when force is removed therefrom. This is accomplished by the single bent wire spring 53 of generally U-shaped configuration. The leg 54 and arm 57 of spring 53 form one elongated bent wire spring section and the leg 55 and arm 58 form another elongated bent wire spring section. The legs 54 and 55 are substantially straight and disposed at the outer face of the inner sheet 42 in alignment with and along the unsevered scorings 50 and 51 serving as the hinges. The cross-piece 56 of the bent spring 53, which is disposed between the outer and inner sheets 41 and 42, functions as means to anchor the ends of the legs 54 and 55 to which the cross-piece 56 is joined. With this arrangement torsional resistance is developed in the legs 54 and 55 by the arms 57 and 58 when the flaps 48 and 49 swing into the dust bag 35, the arms functioning in this manner for the reason that they extend along and bear against the inner surfaces of the flaps.

*Stated another way, the leg 54, V-shaped arm 57 and part of cross-piece 56 of spring 53 form a first length of spring wire associated with the flap 48. The leg 55, V-shaped arm 58 and part of cross-piece 56 of spring 53 form a second length of spring wire associated with the flap 49. As shown in FIG. 6, the first length of spring wire has one end portion 57 freely overlying its associated flap 48 and a remaining portion formed by a part of cross-piece 56 which is sandwiched between the cardboard members 41 and 42. The second length of spring wire has one end portion 58 freely overlying its associated flap 49 and a remaining portion formed by a part of cross-piece 56 which is sandwiched between the cardboard members 41 and 42.*

What is claimed is:

1. An end cover for a dust bag comprising a mounting plate including inner and outer flexible sheets, said outer sheet having a hole therein, said inner sheet having two flaps cut therefrom and being swingable about parallel fold lines out of the plane of said inner sheet to define an opening of greater area than said hole, said sheets being fixed to one another about said opening so as to center said hole with respect to said opening and thereby expose a portion of said outer sheet at said opening to constitute an abutment zone preventing outward swinging of said flaps, spring means urging said flaps against said abutment zone to close said hole, said spring means comprising a single bent wire spring of generally U-shaped configuration having legs joined at one end by a cross-piece and arms extending from the free ends of said legs, said spring being arranged with said legs extending lengthwise of and at the vicinities of said fold lines of the flaps at the outer side of said inner sheet and said cross-piece being anchored between said sheets fixed to one another, and with the arms of said spring engaging the inner surfaces of said flaps so that inward opening of said flaps is torsionally resisted by said legs.

2. In a disposable, self-sealing dust bag for a vacuum cleaner including a dust bag which is open at one end; a mounting plate assembly comprising inner and outer flexible sheets, said outer sheet having a central hole adapted to receive a tubular member for the entry of dust-laden air into the bag, said inner sheet having swingable flap means cut therefrom to define an opening of greater area than said hole at which a portion of said outer sheet is exposed to form an abutment zone for limiting outward swinging of said flap means, said flap means comprising two flaps swingable about parallel fold lines out of the plane of the remainder of said inner sheet, said inner and outer sheets being fixed to one another about said opening of the inner sheet, said dust bag having its open end secured to said inner sheet about said opening, spring means yieldably urging said flaps to closed positions against said abutment zone so as to close said hole when the tubular member is withdrawn therefrom, said spring means comprising a single bent wire spring of generally U-shaped configuration having legs joined at one end by a cross-piece and arms extending from the free ends of said legs, said spring being arranged with said legs extending lengthwise of and at the vicinities of said fold lines of the flaps at the outer side of said inner sheet and said cross-piece anchored between said sheets fixed to one another, and with the arms of said spring engaging the inner surfaces of said flaps so that inward opening of said flaps by the tubular member inserted in said hole is torsionally resisted by said legs.

3. An end closure for a dust bag comprising (a) superimposed outer and inner flexible sheets, (b) the outer sheet having a single hole coplanar therewith and through which dust-laden air is adapted to be introduced into the dust bag, (c) the inner sheet being cut to define two flaps which are integral therewith and coplanar with the inner sheet and normally cantilevered therefrom, (d) both flaps, when in coplanar relation with the inner sheet, being arranged such that they extend in substantially diametrically opposite directions toward one another with their outer free edges substantially in abutting relation and with both flaps covering the single hole in the outer sheet and also overlying regions of the inner face of the outer sheet about the hole, and (e) both flaps being adapted to be forcibly swung into the dust bag to form a single aperture in the inner sheet which is coplanar therewith and at least as large as the single hole in the outer sheet and in registry therewith.

4. An end closure for a dust bag comprising (a) superimposed outer and inner flexible sheets, (b) the outer sheet having a single hole coplanar therewith and through which dust-laden air is adapted to be introduced into the dust bag.

(c) the inner sheet having a plurality of cuts therethrough and a plurality of scorings therein defining two flaps which are integral therewith and coplanar with the inner sheet and adapted to be partially severed from the sheet, (d) both flaps, when coplanar with the inner sheet, being so arranged that they extend in substantially opposite directions toward one another with their outer free edges substantially in abutting relation and with both flaps covering the single hole in the outer sheet and also overlying regions of the inner face of the outer sheet about the hole, (e) the unsevered scorings in the inner sheet being located at opposite sides of the hole in the outer sheet and serving as hinges about which the flaps swing into the dust bag, and (f) both flaps being adapted to be forcibly swung into the dust bag to form a single aperture in the inner sheet which is coplanar therewith and at least as large as the single hole in the outer sheet and in registry therewith.

5. An end closure for a dust bag as set forth in claim 4 which includes (a) a pair of elongated bent wire spring sections, said wire spring sections having legs and arms, (b) the legs being disposed at the outer face of the inner sheet and extending lengthwise of and at the vicinities of the unsevered scorings serving as the hinges, (c) the arms being joined to first ends of the legs, (d) the arms being arranged such that they extend along the inner surfaces of the flaps and, responsive to torsional resistance developed in the legs when the flaps swing into the dust bag, function to bias the flaps to their positions coplanar with the inner sheet when force is removed from the flaps, and (e) means for anchoring the opposite second ends of the legs.

6. An end closure for a dust bag as set forth in claim 4 which includes (a) a single bent wire spring of generally U-shaped configuration having legs joined at one end by a cross-piece and arms extending from the opposite free ends of the legs, (b) the bent wire spring being arranged with the legs at the outer face of the inner sheet and extending lengthwise of and at the vicinities of the unsevered scorings serving as the hinges, and (c) with the cross-piece anchored between the outer and inner sheets and with (d) the arms disposed at the inner surfaces of the flaps and functioning, responsive to torsional resistance developed in the legs when the flaps swing into the dust bag, to bias the flaps to their positions coplanar with the inner sheet when force is removed therefrom.

*7. An article of manufacture comprising an end closure for a filter bag wherein the improvement comprises; an end closure having a pair of disc members juxtaposed one upon another, one of said disc members having an aperture therein and the other of said disc members having a plurality of flaps integral therewith; said flaps being defined by die cut lines and hingedly connected on said other disc by score lines, a length of spring steel operatively associated with each said flap, each of said spring steel lengths having one end portion freely overlying the associated flap and having a remaining portion sandwiched between said disc members.*

*8. An article of manufacture comprising an end closure for a filter bag wherein the improvement comprises; an end closure having a pair of disc members juxtaposed one upon another, one of said disc members having an aperture therein and the other of said disc members having a plurality of flaps integral therewith; said flaps being defined by die cut lines and hingedly connected on said other disc by score lines, a length of spring steel operatively associated with each said flap, each of said spring steel lengths having one end portion overlying the associated flap and having a remaining portion sandwiched between said disc members.*

References Cited

The following references, cited by the Examiner, are of record in the patented file of this patent or the original patent.

UNITED STATES PATENTS

| | | | |
|---|---|---|---|
| 2,070,674 | 2/1937 | Muentener | 55—367 |
| 2,225,389 | 12/1940 | Ostendahl | 55—367 |
| 2,649,926 | 8/1953 | Cranmer | 55—362 |
| 2,848,062 | 8/1958 | Meyerhoeffer | 55—367 |
| 2,961,063 | 11/1960 | Fesco | 55—381 |
| 3,108,736 | 10/1963 | Anderson et al. | 55—367 |
| 3,237,846 | 3/1966 | Brown | 55—367 |

BERNARD NOZICK, Primary Examiner